United States Patent
Hogenkamp et al.

(10) Patent No.: US 6,808,662 B1
(45) Date of Patent: Oct. 26, 2004

(54) METHOD FOR PRODUCING FRICTION LININGS

(75) Inventors: Wolfgang Hogenkamp, Remscheid (DE); Ernst Pollmann, Leverkusen (DE)

(73) Assignee: TMD Friction GmbH, Leverkusen (DE)

( * ) Notice: Subject to any disclaimer, the term of this patent is extended or adjusted under 35 U.S.C. 154(b) by 338 days.

(21) Appl. No.: 10/019,187

(22) PCT Filed: Jun. 7, 2000

(86) PCT No.: PCT/EP00/05217

§ 371 (c)(1),
(2), (4) Date: May 20, 2002

(87) PCT Pub. No.: WO01/02746

PCT Pub. Date: Jan. 11, 2001

(30) Foreign Application Priority Data

Jun. 29, 1999 (DE) .......................................... 199 29 698

(51) Int. Cl.⁷ ............................................... B29C 43/02
(52) U.S. Cl. ........................ 264/40.5; 264/325; 425/149; 425/150
(58) Field of Search ................................. 264/40.5, 325; 425/149, 150

(56) References Cited

U.S. PATENT DOCUMENTS 4,432,922 A * 2/1984 Kaufman et al. ............ 264/119
4,968,468 A * 11/1990 Leinweber ................... 264/113
5,182,061 A * 1/1993 Yasuda et al. ................. 264/72

FOREIGN PATENT DOCUMENTS

GB 2328640 A * 3/1999

* cited by examiner

*Primary Examiner*—Edmund H. Lee
(74) *Attorney, Agent, or Firm*—Diller, Ramik & Wight

(57) ABSTRACT

In a method for manufacturing friction linings with or without an intermediate layer by compressing the friction material mixtures in a mold of a press during a pressing process comprising at least one pressing cycle, wherein a press control unit controls a plurality of manipulated variables individually or in combination with each other to attain a given lining property (controlled variable) of the friction linings, it is provided that at least one characteristic value representative of the lining property of the friction linings is measured in a first pressing cycle or in a plurality of pressing cycles, and that the manipulated variables are controlled in dependence on the at least one measured characteristic value of the current pressing cycle, the subsequent pressing cycles and/or the subsequent pressing processes.

21 Claims, 4 Drawing Sheets

METHOD FOR PRODUCING FRICTION LININGS

BACKGROUND OF THE INVENTION

The invention relates to a method of manufacturing friction linings.

Compression of the friction linings from a friction material mixture is effected by means of a pressing process comprising at least one pressing cycle performed in a press, wherein a press control unit controls, individually or in combination with each other, a plurality of process parameters as manipulated variables to attain a given lining property of the friction linings. This lining property may e. g. be the compressibility of the friction lining, the density, the moduli of elasticity in the three space coordinates or the dimensions of the friction lining.

Quality deviations of the friction material mixture, wear of tools, temperature changes in the pressing tool as well as tolerances of the press control unit are disturbance variables which may considerably affect the lining property of the friction linings even if all other process parameters remain constant.

It is therefore an object of the invention to provide a method for manufacturing friction linings where malproduction is reduced and the reproducibility of the friction lining properties is increased.

SUMMARY OF THE INVENTION

The invention advantageously provides that at least one characteristic value representative for the lining property of the friction linings is measured in a single pressing cycle or in a plurality of pressing cycles and that the process parameters as manipulated variables are controlled in dependence on at least one representative measured characteristic value for the current pressing cycle, for the subsequent pressing cycles and/or subsequent pressing processes. The invention thus aims at measuring the characteristic values during the pressing process and use the thus obtained data for directly controlling the press. Quality deviations of the mixture, wear of tools, temperature change in the pressing tool as well as tolerances of the press control unit can thus be compensated for to a large degree whereby the lining property as a controlled variable can be kept constant. In this manner production variations with regard to the lining properties are minimized and a high reproducibility of the lining quality is attained. The process according to the invention allows improvement of the automation of the production process, in particular in connection with a process control station for a plurality of presses.

As manipulated variables the path travelled by the pressing stamp, the stamping pressure, the pressing and venting times and the pressing temperature can be used individually or in combination with each other. These process parameters can be separately measured on the press and controlled by the press control unit. For example, the stamping pressure, the pressing and venting times and the press temperature can be combinedly readjusted within given limits.

Further, the composition of the friction material mixture, in particular the resin content of the friction material mixture, and/or the quantity of friction material mixture and/or the quantity of a friction material mixture forming the intermediate layer can be used as manipulated variables. In this manner quality deviations of the friction material mixture and/or the weight-in quantity of the friction material mixture can be optimized.

The characteristic value representative of the lining property of the friction linings can, according to a first embodiment of the invention, be obtained from a hysteresis loop of one or a plurality of pressing cycles, said hysteresis loop being supplied by measurement of the stamping pressure in dependence on the path travelled by the pressing stamp.

The measurement of the stamping pressure during opening and closing of the pressing tool in dependence on the path travelled by the pressing stamp results in a hysteresis loop whose characteristic values are directly correlated to the compressed friction lining, in particular to the compressibility of the friction lining. For example, the measured value of the area of the hysteresis loop can be directly used as representative characteristic value for press control purposes.

Alternatively, the representative characteristic value can be obtained from the flow path of the pressing stamp after a given maximum stamping pressure has been reached. When this given stamping pressure has been reached, the further path travelled by the stamp as from this time up to stilstand of the pressing stamp is measured.

According to a further alternative the maximum value of the path travelled by the stamp can be used as representative characteristic value of the lining property of the friction linings.

The representative characteristic value can also be obtained from the ascending slope of the relief curve section of the hysteresis loop supplied by measurement of the stamping pressure in dependence on the path travelled by the pressing stamp.

According to a second embodiment the characteristic value representative of the lining property of the friction lining can be obtained from a hysteresis curve supplied by measurement of the stamping pressure in dependence on the radial pressure acting upon the tool inner wall of the mold.

The characteristic value can e. g. be the area of this hysteresis curve or the maximum value of the radial pressure acting upon the tool inner wall of the mold.

Further, the representative characteristic value can be the pressure difference of the radial pressure acting upon the tool inner wall of the mold when a given maximum stamping pressure has been reached. This pressure difference. correlates well with the compressibility of the friction linings.

Generally, the characteristic value can be the ascending slope value of a predetermined curve section of the hysteresis loop supplied by measurement of the stamping pressure in dependence on the path travelled by the pressing stamp or measurement of the stamping pressure in dependence on the radial pressure acting upon the tool inner wall.

It is possible to control, in terms of time, a predetermined pressure buildup during each pressing cycle by means of measurement of the actual pressing time and measurement of the radial pressure acting upon the tool inner wall.

By measurement of the actual pressing times the aimed pressing times can be exactly adhered to. Form-to-form deviations or press-to-press deviations can be individually compensated for, the same applies to deviations of the pressure buildup and the operating temperature of the press.

The pressure buildup and the pressure relief of the hysteresis curve according to the first and second embodiments can be controlled by time control of the stamping pressure such that the ascending slopes of the pressure buildup curve and the pressure relief curve are almost identical.

By means of temperature measurement the energy consumption of the friction material mixture can be measured, and the temperature measuring signal for controlling the press temperature can be used as manipulated variable.

Alternatively, the radiation heat of the friction lining ejected after the pressing process can be measured, and this temperature measuring signal for controlling the press temperature can be used as manipulated variable.

According to a further alternative, the electrical heating capacity of the press can be measured, wherein this measuring signal controls the press temperature as a manipulated variable.

With regard to the lining properties the compressibility, the density, the moduli of elasticity in the three space coordinates or the dimensions of the friction lining or a combination of the aforementioned friction properties can be used as controlled variable.

The aforementioned method is suited as a method for testing friction lining mixtures. In this manner the reproducibility of the friction material quality can be checked prior to compression, and the friction material mixture can be corrected, if necessary.

BRIEF DESCRIPTION OF THE DRAWINGS

Hereunder embodiments of the invention are described in detail with reference to the drawings in which.

DESCRIPTION OF THE PREFERRED EMBODIMENTS

Figure 1:
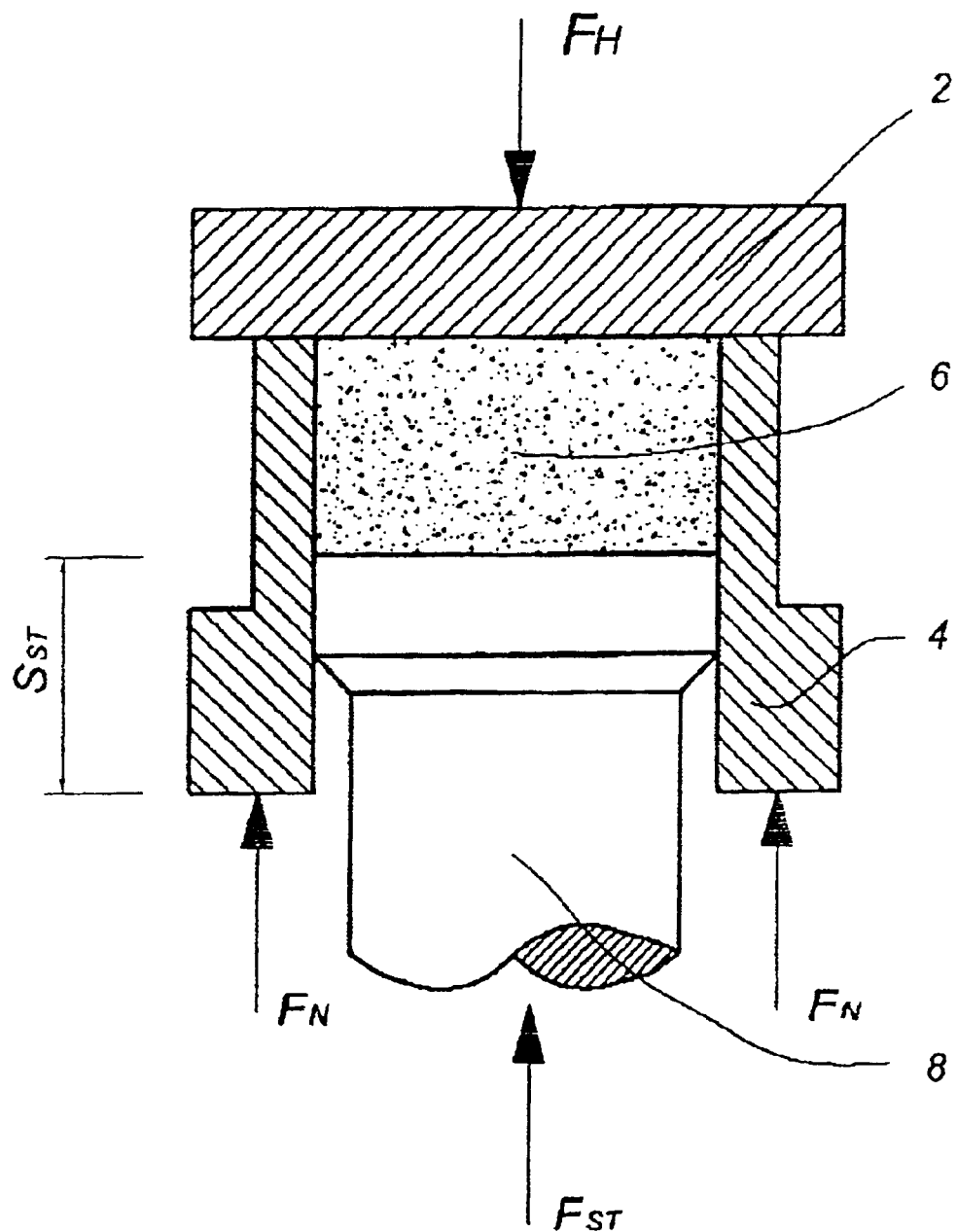
FIG. 1 shows a schematic representation of the mold in a press.

FIG. 1 shows a schematic representation of the pressing mold of a press comprising a heating plate 2, a mold or tool 4 and a pressing stamp 8 movable in the tool. The friction material mixture 6 in the pressing mold surrounded by the tool 4 is compressed by the pressing stamp 8 advanced at a predetermined stamping force $F_{ST}$, wherein the heating plate 2 and the mold 4 are pressed against each other at a closing force $F_H$ and a holding-down force $F_N$, respectively. On the tool 4 can e. g. be measured the radial pressure exerted by the friction material mixture 6 as the normal force acting upon the tool inner wall, and the temperature of the friction material mixture.

The press control unit can control at least the following process parameters as manipulated variables: path travelled by the stamp $S_{ST}$, stamping pressure (stamping force $F_{ST}$), pressing and venting times and press temperature.

Further, these manipulated variables are measured for the purpose of adhering to the aimed values. Moreover, the radial pressure prevailing in the pressing mold is detected during the pressing process.

Further, inter alia, the resin content of the friction material mixture 6 and/or the weight-in quantity of the friction material mixture 6 as the manipulated variables can be changed.

During the pressing process important process parameters are detected, and the radial pressure occurring in the pressing mold is additionally measured.

The process control is to be effected with a characteristic value representative of the lining property of the friction linings, the characteristic value being measured during a first pressing cycle or in a plurality of pressing cycles of a pressing process. Pressing process means compression of the friction material mixture to form a friction lining, wherein this pressing process may comprise one or a plurality of pressing cycles separated from each other by a venting time. Each pressing cycle comprises a pressure-buildup phase, a holding phase in which a certain stamping pressure is maintained, and a pressure relief phase.

The measured values of the process parameters and the radial pressure determined during a pressing cycle are supplied to the press control unit which can directly change the process parameters used as manipulated variables for the next pressing cycle.

Alternatively, the measured data of a predetermined number of pressing cycles or pressing processes are collected and jointly used, e. g. by averaging, for press controlling purposes. All measured data can further be stored for producing characteristic diagrams related to the characteristic value in order to detect the influence of various manipulated variables on a characteristic value. These characteristic diagrams can then be used to e. g. simultaneously change a plurality of manipulated variables and optimize the press control.

In the first embodiment it is provided that the characteristic value representative of the lining property of the friction linings is obtained from a hysteresis curve of one or a plurality of pressing cycles supplied by measurement of the stamping pressure in dependence on the path travelled by the pressing stamp.

Figure 2:
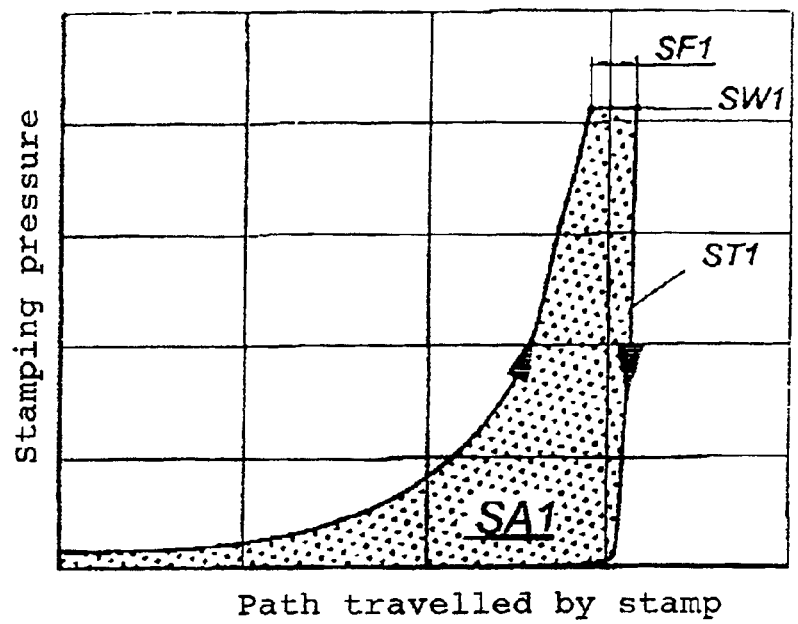
FIG. 2 shows a pressing cycle according to a first embodiment, wherein the stamping pressure is plotted in dependence on the path travelled by the stamp.

FIG. 2 shows how the stamping pressure depends on the stamping path $S_{ST}$. The stamping pressure is calculated from the stamping force $F_{ST}$ and the stamping area. The measured values of stamping pressure and stamping path during opening and closing of the pressing tool result in a hysteresis curve. The area SA1 of the hysteresis curve, the flow path SF1, the ascending slope of the relief curve ST1 and the maximum value of the stamping path SW1 can be directly used as characteristic values for press controlling purposes, all the more so since all measured values are available immediately after a pressing process and display a close correlation to the lining properties which are to be kept constant.

Figure 3:
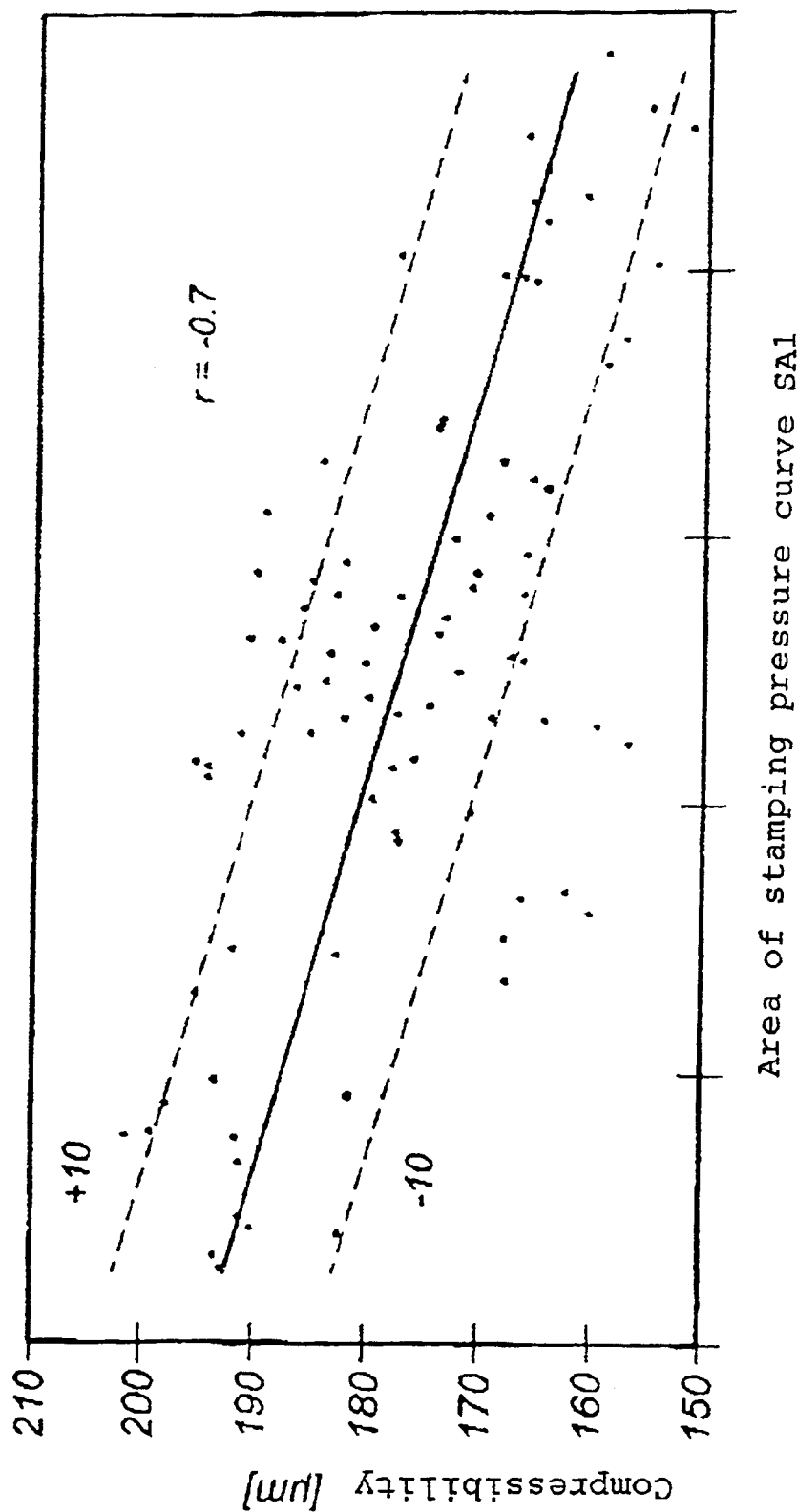
FIG. 3 shows the correlation between the compressibility of the friction lining and the area of the stamping pressure curve according to FIG. 2.

FIG. 3 shows e. g. the correlation between the compressibility as a lining property of the friction lining and the area SA1 of the stamping pressure curve shown in FIG. 2. The correlation coefficient amounts to 0.7 such that the area SA1 is a suitable representative characteristic value for controlling the compressibility. In this manner the press can be controlled in terms of pressure buildup and pressure relief, pressing and venting times and press temperature such that a high reproducibility of the lining properties is attained.

According to a second embodiment it is provided that the characteristic value representative of the lining property of the friction linings is obtained from a hysteresis curve of one or a plurality of pressing cycles supplied by measurement of the stamping pressure in dependence on the radial pressure acting upon the tool inner wall of the pressing mold.

Figure 4:
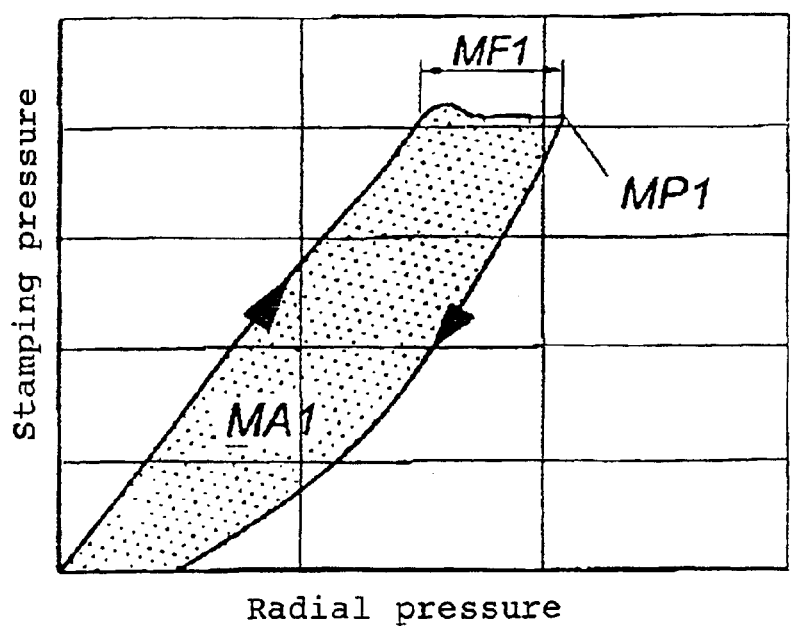
FIG. 4 shows a pressing cycle according to a second embodiment where the stamping pressure is plotted in dependence on the radial pressure.

FIG. 4 shows the march of pressure in a pressing cycle during opening and subsequent closing of the pressing tool, wherein the stamping pressure is plotted in dependence on the radial pressure acting upon the tool inner wall. This again results in a hysteresis curve whose area is designated by MA1. As can be seen from the diagram, the stamping pressure is built up to a value of just above 20 MPa and then kept constant for a given period of time. During this time the radial pressure nevertheless increases up to a maximum value MP1. The pressure difference at constant stamping pressure is measured, with this measured value also being characteristic of the flow behaviour of the friction material mixture.

Figure 5:
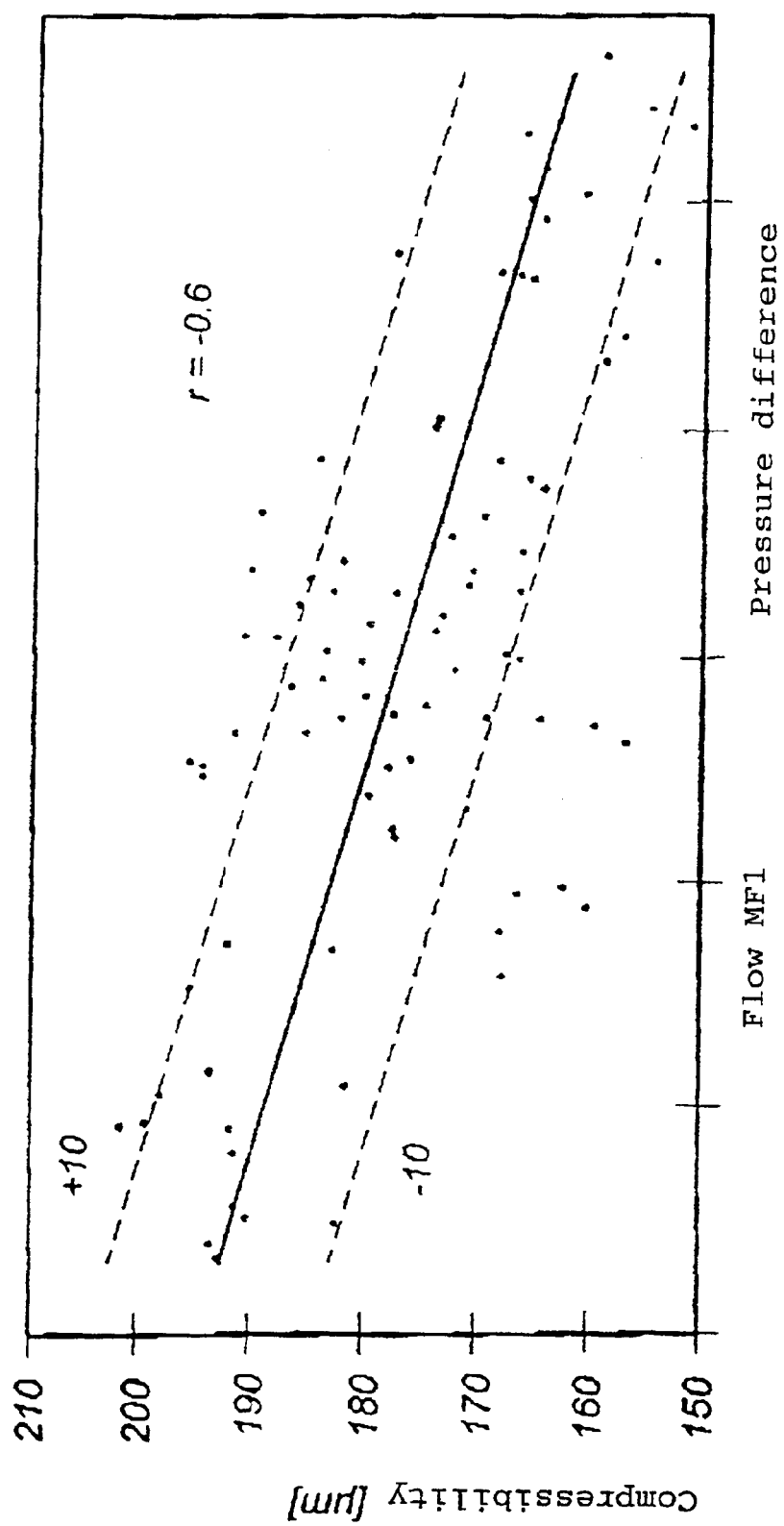
FIG. 5 shows the correlation between the compressibility of the friction lining in dependence on its flow behaviour as shown in FIG. 4.

In FIG. 5 the compressibility of the friction lining is plotted in dependence on the pressure difference MF1. It can be seen from the diagram that the measurement of the pressure difference MF1 of the radial pressure displays a satisfactory correlation to the compressibility of the friction lining. The correlation coefficient of the test series shown in FIG. 5 amounts to 0.6. Thus the pressure difference MF1 is also a suitable representative characteristic value.

The radial pressure acting upon the tool inner wail results from the viscoelastic properties of the friction material mixture. The measurement of the radial pressure furnishes information on the flowability and the cross-linkage pattern of the compressed friction material mixture. These measurements allow conclusions to be drawn with regard to the resin content, the type of resin used, the homogeneity and the moisture degree of the friction material mixture such that a mixture control can be performed. When the radial pressure deviates from a given aimed value, the press control unit may e. g. change the venting phases between two pressing cycles of a pressing process. These venting phases are provided between at least two pressing cycles in the case of multi-stage pressing.

By suitable arrangement of temperature sensors in the mold the energy consumption of the pressed part can be detected more accurately, and the measured values can be used for more precise heating control. Alternatively, the radiation heat of the friction lining ejected from the pressing mold can be measured, wherein the temperature value and the temperature distribution are a measure for the correct heat transmission in the friction material mixture. These measured values, too, are suitable for carrying out a precise heating control.

The dependence of the controlled variable on the representative characteristic value, as exemplary shown in FIGS. 3 and 5, is stored in the press control unit as is the dependence of the representative characteristic value on one of the manipulated variables. If therefore a deviation with regard to the lining property as a controlled variable is detected, the press control unit can perform a control of the manipulated variables with the aid of algorithms which reflect the dependence of the representative characteristic value on the manipulated variables such that high reproducibility of the a friction property can be obtained.

Of course, a plurality of manipulated variables can be simultaneously changed to lead the representative characteristic value to a desired value. In this case multi-dimensional characteristic diagrams are stored in the press control unit, the characteristic diagrams including the dependence of the representative characteristic value on a plurality of manipulated variables thus allowing optimization of the pressing process. For the manipulated variables respective given adjustment spectra are specified such that the press control unit can optimize the pressing process by simultaneously controlling a plurality of manipulated variables without selecting any extreme values within the adjustment spectrum of the manipulated variables.

Finally, it is also possible to permanently renew, in a learning cycle, the characteristic diagrams reflecting the dependence of the representative characteristic values on the manipulated variables by storing the measured values detected during the pressing process using a certain tool and a certain friction material mixture.

The characteristic values SA1, SF1, SW1, ST1 and MA1, MF1 and MP1, respectively, shown in FIGS. 2 and 4, relate to a first pressing cycle. These characteristic values of a first pressing cycle can be used individually or in combination with each other for press controlling purposes. It is however also possible to combine the characteristic values SA1 to SAn, SF1 to SFn, SW1 to SWn, MA1 to MAn, MF1 to MFn, and MP1 to MPn of a plurality of pressing cycles in order to control the pressing process. Preferably, the characteristic values obtained during each pressing cycle are directly used for correcting the manipulated variables used in the previous pressing cycle.

The method allows operation of a press within the range of its capacity, reduction of the pressing times, reduction of the reject rate and simultaneous increase of the lining quality. An essential aspect is that variations in the friction lining mixture can be compensated for by the proposed process control. The method further allows a plurality of presses to be operated with the aid of a process control station.

Although a preferred embodiment of the invention has been specifically illustrated and described herein, it is to be understood that minor variations may be made in the apparatus without departing from the spirit and scope of the invention, as defined the appended claims.

What is claimed is:

1. Method for manufacturing friction linings with or without intermediate layer by compressing the friction material mixture in a mold of a press during a pressing process comprising at least one pressing cycle, wherein a press control unit controls a plurality of manipulated variables individually or in combination with each other in order to attain a given lining property (controlled variable) of the friction linings, characterized in that at least one characteristic value representative of the lining property of the friction linings is measured during a first pressing cycle or a plurality of pressing cycles, and the manipulated variables are controlled in dependence on the at least one measured characteristic value of the current pressing cycle, the subsequent pressing cycles and/or the subsequent pressing processes.

2. Method according to claim 1, characterized in that the path travelled by the pressing stamp, the stamping pressure, the pressing and venting times and the press temperature are used, individually or in combination with each other, as manipulated variables.

3. Method according to claim 1, characterized in that the composition of the friction material mixture, in particular the resin content of the friction material mixture, and/or the quantity of the friction material mixture and/or the quantity of a friction material mixture forming the intermediate layer are used as additional manipulated variables.

4. Method according to claim 1, characterized in that the characteristic value representative of the friction property of the friction linings is obtained from a hysteresis curve of one or a plurality of pressing cycles supplied by measurement of the stamping pressure in dependence on the path travelled by the pressing stamp.

5. Method according to claim 4, characterized in that the characteristic value is the area (SA1, ..., SAn) of the hysteresis curve.

6. Method according to claim 4, characterized in that the characteristic value is the flow path of the pressing stamp (SF1, ..., SFn) after a given maximum stamping pressure has been reached.

7. Method according to claim 4, characterized in that the characteristic value is the maximum value (SW1, ..., SWn) of the stamp path.

8. Method according to claim 4, characterized in that the characteristic value is the ascending slope of the relief curve section (ST1, ..., STn).

9. Method according to claim 1, characterized in that the characteristic value representative of the lining property of the friction linings is obtained from a hysteresis curve of one or a plurality of pressing cycles supplied by measurement of the stamping pressure in dependence on the radial pressure acting upon the tool inner wall of the pressing form.

10. Method according to claim 9, characterized in that the characteristic value is the area (MA1, ..., MAn) of the hysteresis curve.

11. Method according to claim 9, characterized in that the characteristic value is the maximum value (MP1, ..., MPn) of the radial pressure acting upon the tool inner wall of the mold.

12. Method according to claim 9, characterized in that the characteristic value is the pressure difference (MF1, ..., MFn) of the radial pressure acting upon the tool inner wall of the mold after a given maximum stamping pressure has been reached.

13. Method according to claim 4, characterized in that the characteristic value is the ascending slope of a predetermined curve section of the hysteresis loop.

14. Method according to claim 9, characterized in that a predetermined pressure buildup and pressure reduction are controlled in terms of time by means of measurement of the actual pressing time, and measurement of the radial pressure acting upon the tool inner wall during the first pressing cycle or in each pressing cycle.

15. Method according to claim 4, characterized in that the pressure buildup and the pressure relief of the hysteresis curve are controlled by time control of the stamp pressure such that the ascending slopes of the pressure-buildup curve and the pressure relief curve are almost identical.

16. Method according to claim 1, characterized in that the energy consumption of the friction material mixture is measured by temperature measurement in the press mold, and the temperature measuring signal controls the press temperature as a manipulated variable.

17. Method according to claim 1, characterized in that the radiation heat of the friction lining ejected after the pressing process is measured, and the temperature measuring signal controls the press temperature as a manipulated variable.

18. Method according to claim 1, characterized in that the electrical heating capacity of the press is measured, and the measuring signal controls the press temperature as a manipulated variable.

19. Method according to claim 1, characterized in that the compressibility, the density, the moduli of elasticity in the three space coordinates, the dimensions of the friction lining or a combination of the aforementioned (lining properties) are used as controlled variable.

20. Method according to claim 9, characterized in that the characteristic value is the ascending slope of a predetermined curve section of the hysteresis loop.

21. Method according to claim 9, characterized in that the pressure buildup and the pressure relief of the hysteresis curve are controlled by time control of the stamp pressure such that the ascending slopes of the pressure-buildup curve and the pressure relief curve are almost identical.

* * * * *